United States Patent [19]
Luck et al.

[11] Patent Number: 5,986,464
[45] Date of Patent: Nov. 16, 1999

[54] THRESHOLD LOGIC CIRCUIT WITH LOW SPACE REQUIREMENT

[75] Inventors: Andreas Luck, München; Roland Thewes, Groebenzell; Werner Weber, München, all of Germany

[73] Assignee: Siemens Aktiengesellschaft, Munich, Germany

[21] Appl. No.: 08/959,257

[22] Filed: Oct. 29, 1997

[30] Foreign Application Priority Data

Oct. 29, 1996 [DE] Germany ............... 196 44 976

[51] Int. Cl.[6] .................................................. H03K 19/23
[52] U.S. Cl. ............................................. 326/36; 326/53
[58] Field of Search .......................... 326/35, 36, 52–55

[56] References Cited

U.S. PATENT DOCUMENTS 4,663,740  5/1987  Ebel .

FOREIGN PATENT DOCUMENTS 195 21 092 C1   7/1996   Germany .
192 21 089 C1   8/1996   Germany .
96/42049       12/1996   WIPO .

OTHER PUBLICATIONS

Abstract of International Publication No. 96/42051 (Prange), dated Dec. 27, 1996.

Abstract of International Publication No. 96/42048 (Prange et al.), dated Dec. 27, 1996.

"Some Improvements in the Implementation of Multithreshold and Multivalued I$^2$L circuits" (Pelayo et al.), International Journal of Electronics, vol. 66, No. 1, 1989, pp. 19–34.

"A Functional MOS Transistor Featuring Gate–Level Weighted Sum and Threshold Operations" (Shibata et al.), IEEE Transactions on Electron Devices, vol. 39, No. 6, Jun. 1992, pp. 1444–1455.

Primary Examiner—Jon Santamauro
Assistant Examiner—Don Phu Le
Attorney, Agent, or Firm—Herbert L. Lerner; Laurence A. Greenberg

[57] ABSTRACT

A threshold logic circuit with a low space requirement includes a first and at least one second circuit portion, each of which has an evaluator circuit and at least two branches to be evaluated. A partial sum signal formed in the first circuit portion is jointly used for the at least one second circuit portion and is not formed separately in each case. The main advantage is a low chip area consumption.

3 Claims, 2 Drawing Sheets

THRESHOLD LOGIC CIRCUIT WITH LOW SPACE REQUIREMENT

BACKGROUND OF THE INVENTION

Field of the Invention

A threshold logic circuit substantially includes elements for summation of weighted input variables and ensuing threshold value formation. So-called neural MOS transistors, which have a floating gate similar to that in EPROMs, can be used, among others, for such logic circuits.

The structure of neural MOS transistors and their use in threshold logic circuits are known from IEEE Transactions on Electron Devices, Vol. 39, No. 6, June 1992, pp. 1444–1455.

In a threshold logic circuit which is known from International Pat. application WO 96/42049, at least one first and one second circuit part, each with its own evaluator circuit, and elements for summation of convoluted input variables, are present.

However, such threshold logic circuits have a relatively large chip area.

SUMMARY OF THE INVENTION

It is accordingly an object of the invention to provide a threshold logic circuit, which overcomes the hereinaforementioned disadvantages of the heretofore-known devices of this general type and has the smallest possible chip area.

With the foregoing and other objects in view there is provided, in accordance with the invention, a threshold logic circuit, comprising a first circuit portion having an evaluator circuit and a neural MOS transistor with a gate electrode supplying a partial sum signal; and at least one second circuit portion having an evaluator circuit and at least one further neural MOS transistor to be triggered the partial sum signal.

In accordance with another feature of the invention, there is provided a common polysilicon region, at least two of the neural MOS transistors in at least two of the circuit portions having channels simultaneously triggered by the partial sum signal through the common polysilicon region.

In accordance with a concomitant feature of the invention, the gate electrode of the neural MOS transistor in the first circuit portion is electrically insulated from input signals for multiplication bits, a carry input bit and a sum input bit; and the partial sum signal triggers the at least one further neural MOS transistor to form a multiplication sum bit in the second circuit portion, for forming a multiplication carry bit at the gate electrode of the neural MOS transistor in the first circuit portion.

Other features which are considered as characteristic for the invention are set forth in the appended claims.

Although the invention is illustrated and described herein as embodied in a threshold logic circuit with a low space requirement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Many logic operations, such as binary multiplication or binary addition, can be described in the form of a system of threshold equations as follows:

$$f_1(x_1, \ldots, x_m) = 1, \text{ if } w_{11}x_1 + w_{12}x_2 + \ldots + w_{1m}x_m \geq T_1 \quad (1)$$
$$= 0, \text{ if not}$$
$$\vdots$$
$$f_n(x_1, \ldots, x_m) = 1, \text{ if } w_{n1}x_1 + w_{n2}x_2 + \ldots + w_{nm}x_m \geq T_n$$
$$= 0, \text{ if not}$$

where $n \geq 2$ and $m \geq 2$.

In this case $x_i$ where $i=1 \ldots m$ are the input variables, $W_{ki}$ where $i=1 \ldots m$ and $k=1 \ldots n$ are the weighting factors, and $T_i$ where $i=1 \ldots n$ are the threshold values of the equation system or inequality system. In actual circuitry embodiments, the $x_i$ values are often binary values that can assume only the values of 0 and 1. If at least two vectors $(W_{i1}, W_{i2}, \ldots, W_{im})$ and $(W_{j1}, W_{j2}, \ldots, W_{jm})$ of the weighting factors of one line, where $i \neq j$, $i \leq n$ and $j \leq n$ are similar in such a way that many elements agree, that is that $W_{ik}=W_{jk}$ is true for as many subscripts k as possible, where $1 \leq k \leq m$, then the condition sides of lines i and j of the equation system (1) can be converted in such a way that identical partial sums are located on the one side, referred to below as the left-hand side, of the "$\geq$" symbol, while the terms that do not agree in the two lines are located on the other side, referred to below as the right-hand side. Written in a formal way, the following results are obtained for lines i and j:

$$f_i(x_1, \ldots, x_m) = 1, \text{ if } \sum_{\substack{\text{for all } t \text{ or which} \\ w_{it}=w_{jt} \text{ is true}}} w_{it}x_t \geq T_i + \sum_{\substack{\text{for all } t \text{ for which} \\ w_{it} \neq w_{jt}}} W_{it}x_t, \quad (2)$$

$f_i = 0$, if not $$f_j(x_1, \ldots, x_m) = 1, \text{ if } \sum_{\substack{\text{for all } t \text{ for which} \\ w_{it}=w_{jt} \text{ is true}}} w_{jt}x_t \geq T_j + \sum_{\substack{\text{for all } t \text{ for which} \\ w_{it} \neq w_{jt} \text{ is true}}} W_{jt}x_t,$$

$f_j = 0$, if not.

As long as it is also true that $T_i=T_j$, then $T_i$ and $T_j$ are also placed on the side with identical partial sums.

In order to provide a conversion by circuitry, it then follows from system (2) that the common partial sum term, in this case the left-hand side of the inequalities, is now realized only once. Then this partial sum signal, which is realized once in a partial circuit, is also delivered to other parts of the threshold logic circuit for processing.

As already noted above, the minimum condition is that at least two functions $f_i$ and $f_j$ of the equation system (1) have identical partial sum terms in the condition portion. If one equation system has a plurality of functions with identical partial sums, then these sums can be combined into corresponding groups, where in the minimum case the respective identical term is generated only a single time for each function group.

Figure 1:
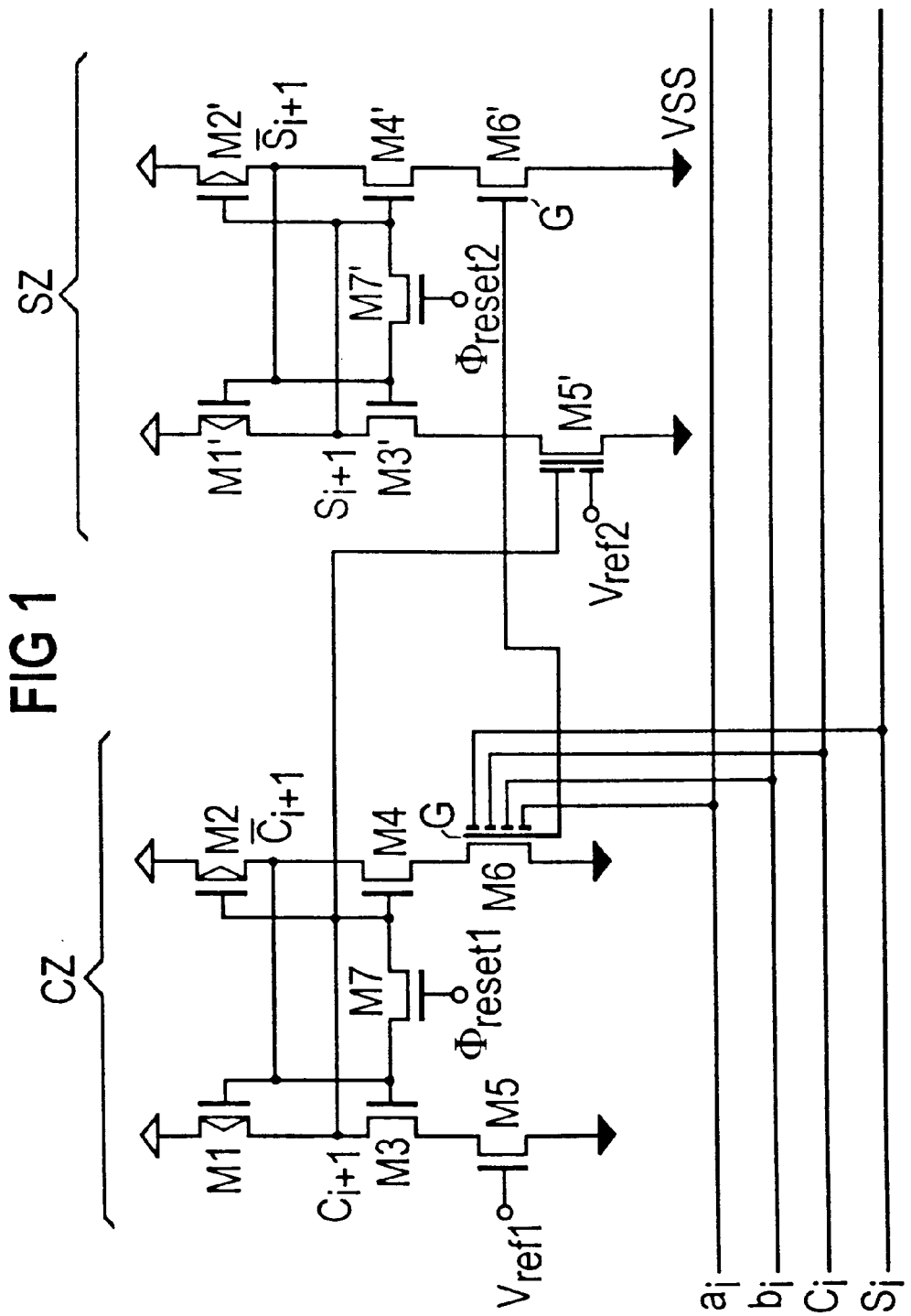
FIG. 1 is a schematic circuit diagram of a threshold logic circuit according to the invention, using a multiplier as an example.

Referring now to the figures of the drawings in detail and first, particularly, to FIG. 1 thereof, there is seen, by way of example, a multiplier cell according to the invention which is shown as a threshold logic circuit, having the following equations:

$$C_{i+1}(a_1, a_2, S_i, C_i) = 1, \text{ if } a_1 + a_2 + 2*S_i + 2*C_i - 4 \geq 0 \quad (3)$$
$$= 0, \text{ if not}$$

and $$S_{i+1}(a_1, a_2, S_i, C_i, C_{i+1}) = 1, \text{ if } a_1 + a_2 + 2*S_i + 2*C_i - 4*C_{i+1} - 2 \geq 0 \quad (4)$$
$$= 0, \text{ if not}$$

in which $a_i$ and $b_i$ are bits to be multiplied, $C_i$ and $S_i$ are a carry bit and a sum bit of an immediately preceding stage, and $C_{i+1}$ and $S_{i+1}$ are a carry bit and sum bit for an immediately subsequent stage, and the multiplier cell has one cell portion CZ for forming the carry bit $C_{i+1}$ and one cell portion SZ for forming the sum bit $S_{i+1}$.

The cell portion or first circuit portion CZ includes an evaluator circuit, which has two input branches for the weighted summation of input and reference signals. The evaluator circuit has p-channel MOS transistors M1 and M2 and n-channel MOS transistors M3, M4 and M7. The transistors M1 and M3 form an inverter, and the transistors M2 and M4 form an inverter. The inverters are fed back crosswise and thus form a hold element with one another, which can be reset with the aid of a reset signal $\Phi_{reset1}$ through the use of the transistor M7 that connects the inputs of these inverters. The inverter having the transistors M1 and M3 forms the carry signal $C_{i+1}$ and is connected through a left-hand branch in the form of an n-channel MOS transistor M5 to a reference potential VSS. A reference voltage Vref for adjusting the threshold in accordance with equation (3) is present at the gate of the transistor M5. The inverter having the transistors M2 and M4 is connected through a right-hand path in the form of a neural MOS transistor M6 to the reference potential VSS. A floating gate G of the transistor M6 carries a partial sum signal $TS=a_1+a_2+2*S_i+2*C_i$, and input gates isolated from it are connected to the inputs for the bits $a_i$, $b_i$, $C_i$ and $S_i$.

The cell portion or second circuit portion SZ for forming the sum bit $S_{i+1}$, like the cell portion CZ for forming the carry bit $C_{i+1}$, also contains an evaluator with two input branches. The evaluator circuit has transistors M1', M2', M3', M4' and M7', and it forms the signal $S_{i+1}$ instead of the signal $C_{i+1}$. A left-hand branch in the cell portion SZ has a neural MOS transistor M5' for forming a value $4*C_{i+1}+2$. This term is obtained by a conversion of equation (4). A right-hand branch of the cell portion SZ is supplied with the partial sum signal $TS=a_1+a_2+2*S_i+2*C_i$ by a floating gate G of the n-channel MOS transistor M6'.

Figure 2:
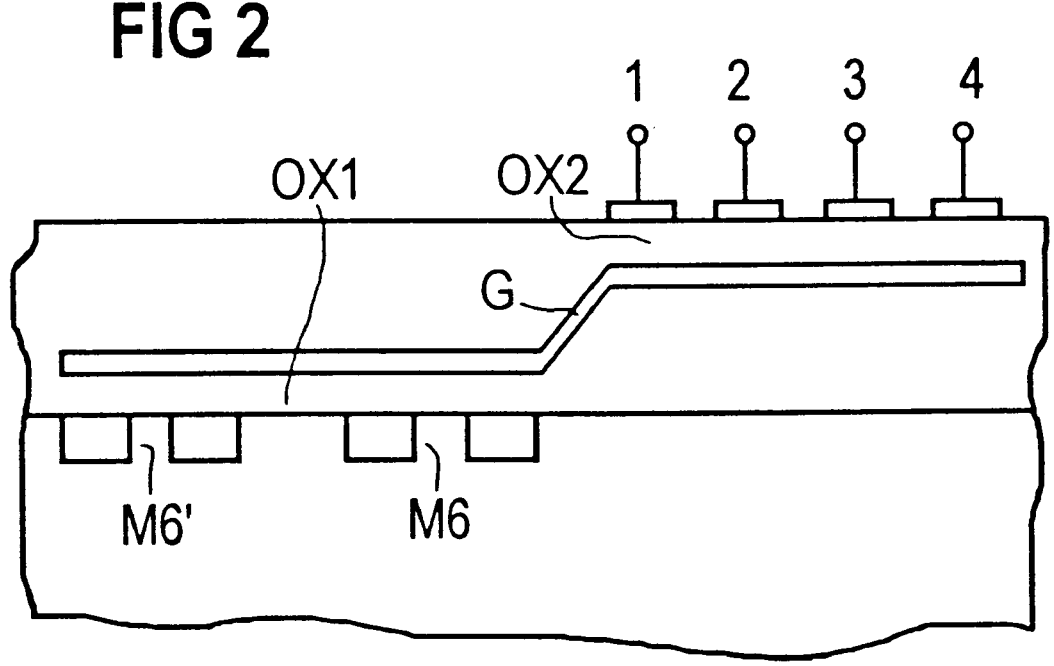
FIG. 2 is a fragmentary, diagrammatic, sectional view of a portion of the threshold logic circuit of FIG. 1.

This is advantageously accomplished by providing that the channel regions of the corresponding neural MOS transistors M6 and M6' are located relatively close together and are covered by a common electrically conductive region for the floating gate G, is as shown as an example in FIG. 2. The common electrically conductive region is insulated by a thin insulator film OX1. Input gates 1 . . . 4 of the transistor M6 are separated from the floating gate G by a thin insulator film OX2 and thus form input capacitors which are connected to one another on one side and are provided for generating the partial sum signal TS at the floating gate G. The insulator layers OX1, OX2 in this case are formed of $SiO_2$ for instance, and the electrically conductive region is, for instance, formed of polysilicon.

The same is correspondingly true for each threshold logic circuit having a first circuit portion CZ and at least one second circuit portion SZ, with threshold equations that can be converted in such a way that they have identical partial sum signals TS. A partial sum signal TS formed in the first circuit portion CZ is delivered to the second circuit portion SZ, so that in the at least one second circuit portion, the partial sum signal no longer needs to be formed with the aid of a relatively large-area neural MOS transistor that has many input gates.

We claim:

1. A threshold logic circuit, comprising:

a first circuit portion having an evaluator circuit and a neural MOS transistor with a floating gate electrode supplying a partial sum signal; and at least one second circuit portion having an evaluator circuit and at least one further MOS transistor to be triggered by the partial sum signal.

2. The threshold logic circuit according to claim 1, including a common polysilicon region, at least two of said MOS transistors in at least two of said circuit portions having channels simultaneously triggered by the partial sum signal through said common polysilicon region.

3. The threshold logic circuit according to claim 1, wherein:

said gate electrode of said neural MOS transistor in said first circuit portion is electrically insulated from input signals for multiplication bits, a carry input bit and a sum input bit; and the partial sum signal triggers said at least one further MOS transistor to form a multiplication sum bit in said second circuit portion, for forming a multiplication carry bit at said gate electrode of said neural MOS transistor in said first circuit portion.

* * * * *